(12) United States Patent
Funakoshi (10) Patent No.: US 6,498,332 B2
(45) Date of Patent: Dec. 24, 2002

(54) SOLID-STATE IMAGE SENSING DEVICE (75) Inventor: Haruhiro Funakoshi, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 0 days.

(21) Appl. No.: 09/798,952

(22) Filed: Mar. 6, 2001

(65) Prior Publication Data

US 2001/0008268 A1 Jul. 19, 2001

Related U.S. Application Data (63) Continuation-in-part of application No. PCT/JP99/04843, filed on Sep. 7, 1999.

(30) Foreign Application Priority Data

Sep. 9, 1998 (JP) ............................................. 10-255404

(51) Int. Cl.$^7$ .............................................. H01L 27/14
(52) U.S. Cl. .............................. 250/208.1; 250/214 LA; 348/308
(58) Field of Search ....................... 250/208.1, 214 LA, 250/214.1, 214 R; 348/281–283, 294–295, 302, 304, 308–309, 311–312; 365/221–222

(56) References Cited

U.S. PATENT DOCUMENTS

| | | | |
|---|---|---|---|
| 5,726,439 A | * | 3/1998 | Miyawaki et al. ........ 250/208.1 |
| 5,731,578 A | * | 3/1998 | Mizuno .................. 250/208.1 |
| 6,002,435 A | * | 12/1999 | Yamamoto et al. ......... 348/307 |
| 6,128,039 A | * | 10/2000 | Chen et al. ................. 348/294 |
| 6,201,573 B1 | * | 3/2001 | Mizuno ....................... 348/308 |

FOREIGN PATENT DOCUMENTS

| | | |
|---|---|---|
| JP | 5-215602 | 8/1993 |
| JP | 6-189204 | 7/1994 |
| JP | 8-018866 | 1/1996 |
| JP | 8-331459 | 12/1996 |
| JP | 9-247538 | 9/1997 |
| JP | 10-023336 | 1/1998 |

OTHER PUBLICATIONS

J.C. Stanton, "A Low Power Low Noise Amplifier for a 128 Channel Detector Read–Out Chip," IEEE Transactions on Nuclear Science, vol. 36, No. 1, Feb. 1989, pp. 522–527.

* cited by examiner

Primary Examiner—Kevin Pyo
Assistant Examiner—Seung C. Sohn
(74) Attorney, Agent, or Firm—Morgan, Lewis & Bockius LLP (57) ABSTRACT

A drive circuit 270 having a differential amplifier 271, a current controller 272 formed from an n-channel MOSFET, and a drive ability control circuit sets its output drive ability in a high state only in a signal read, and otherwise sets the output drive ability in a low state to reduce power consumption. Thus, a solid-state image sensing device which can perform a high-speed read while ensuring low power consumption and wide dynamic range can be implemented. As the drive ability control circuit, for example, a current source 273 formed from an n-channel MOSFET and voltage switching by a drive change-over switch 274 can be used.

4 Claims, 4 Drawing Sheets

SOLID-STATE IMAGE SENSING DEVICE

RELATED APPLICATION

This is a continuation-in-part application of application Ser. No. PCT/JP99/04843 filed on Sep. 7, 1999, now pending.

BACKGROUND OF THE INVENTION

1. Field of the Invention

The present invention relates to a solid-state image sensing device for sensing an input one- or two-dimensional optical image.

2. Related Background Art

Image sensing devices using solid-state image sensing elements represented by a charge-coupled device (CCD) are used in various fields including home video cameras. However, when a CCD is used as an image sensing element having a relatively large light-receiving area, charges cannot be sufficiently transferred because of the low charge transfer efficiency of the CCD. Hence, of solid-state image sensing devices, MOS image sensors are used in specific fields because they have no problem of charge transfer efficiency.

A MOS image sensor for sensing a one- or two-dimensional optical image conventionally employs a scheme in which one discrete amplifier is arranged for a one- or two-dimensional photodiode array, and a photodetection signal from each photodiode is amplified and then extracted. In recent years, there is proposed an optical sensor device which maintains a linear photoelectric conversion characteristic even in an area with a small light amount in a short read time while exploiting the advantages of the MOS image sensor.

In this device, the output from a photodiode is read through a charge amplification circuit and source follower circuit ("Japanese Patent Laid-Open No. 5-215602 (prior art 1)", and "J. C. Stanton, IEEE Transactions on Nuclear Science, Vol. 36, No 1, February 1989, pp. 522–527 (prior art 2)".

Figure 4:
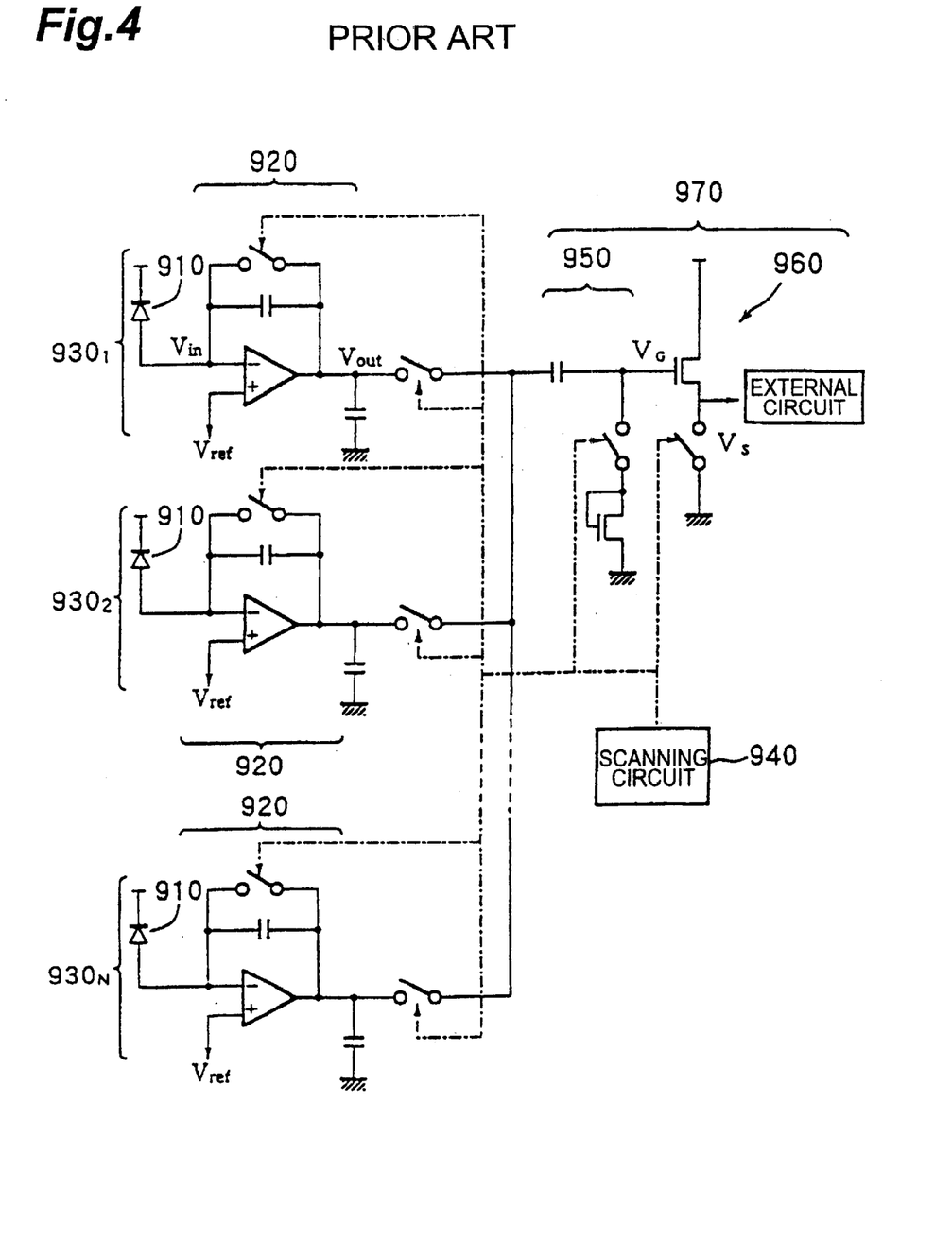
FIG. 4 is a circuit diagram showing a conventional solid-state image sensing device.

FIG. 4 is a circuit diagram of a device disclosed in prior art 1. A device disclosed in prior art 2 also substantially has the same circuit arrangement as that of prior art 1. As shown in FIG. 4, the device comprises (a) sensors $930_1$ to $930_N$ each having a photodiode 910 and charge amplification circuit 920 for receiving a photodetection signal output from the photodiode 910 and integrating charges, and (b) a buffer circuit 970 having a clamp circuit 950 for receiving a signal output from a sensor $930_i$ alternatively selected by a scanning circuit 940 and clamping the signal and a source follower circuit 960 for receiving the signal output from the clamp circuit 950 and generating a source follower output.

In this device, the charge amplification circuit 920 receives a current signal by charges generated in accordance with light incidence on the photodiode 910 and integrates the charges. An integration signal as a signal output from the sensor $930_i$ alternatively selected in accordance with a scanning instruction signal output from the scanning circuit 940 is sequentially obtained through the clamp circuit 950 and then through the source follower circuit 960.

SUMMARY OF THE INVENTION

In the above optical sensor device, when a two-dimensional image sensor or an image sensor having a one-dimensional array of photodiodes each paired with a signal processing circuit is formed, the following problems are posed.

(1) Problem of Linearity

In the device shown in FIG. 4, by the source follower circuit 960 of the MOSFET, the charge integration result output from the charge amplification circuit 920 is input from the gate of the MOSFET and output to an external circuit from the source of the MOSFET. Hence, letting VG be the gate potential, and VS be the source potential, $$VS=VG-Vth-(2I/Kp)^{1/2} \quad (1)$$

holds, where

Vth: threshold voltage of the MOSFET

I: drain current of the MOSFET

Kp: Constant based on manufacturing parameters and size of the MOSFET

The value Vth varies depending on the source potential VS. Hence, $$Vth=Vth0+\gamma((VS+Vb)^{1/2}-Vb^{1/2}) \quad (2)$$

where

Vth0: threshold voltage unique to the MOSFET

γ: substrate constant unique to the MOSFET

Vb: base potential of the MOSFET

The base potential Vb is generally fixed to a predetermined potential by, e.g., grounding it for an NMOS.

As is apparent from equations (1) and (2), it is difficult to maintain a linear relationship between the gate potential VG, i.e., integration result signal and the source potential VS, i.e., output signal.

To prevent this, when interconnection is done such that the well potential of the MOSFET becomes the source potential VS, the parasitic capacitance largely increases due to the well, resulting in difficulty in high-speed operation.

(2) Problem of Operation Speed

In the device shown in FIG. 4, when the sensor $930_i$ is selected by the scanning circuit 940, the parasitic capacitance of the source terminal is immediately charged up to obtain the source potential VS shown in equation (1). To increase the charge-up speed of the parasitic capacitance of the source terminal for a high-speed operation, the value of steady-state current flowing to the source follower circuit must be increased.

However, when the value of steady-state current is increased, the voltage value between the gate and the source in the source follower circuit increases. As a result, the dynamic range of the output signal voltage narrows.

If the MOSFET size is increased to solve the above problem, the parasitic capacitance also increases, resulting in difficulty in high-speed operation.

That is, the device shown in FIG. 4 cannot simultaneously realize high-speed operation and ensure the dynamic range of the output. This problem especially becomes serious when the constituent elements are integrated as an array.

The present invention has been made in consideration of the above situation, and has as its object to provide a solid-state image sensing device which enables high-speed operation while sufficiently ensuring the dynamic range of the output signal and reduces power consumption even when the elements are integrated.

In order to achieve the above object, according to the present invention, there is provided a solid-state image sensing device for sensing an input optical image, characterized by comprising (1) a light-receiving section in which the first number of light-receiving elements are arrayed along a first direction, each light-receiving element including a photoelectric conversion element for converting an input optical signal into a current signal and a switch element having a first terminal connected to a signal output terminal of the photoelectric conversion element and a second terminal for outputting the current signal generated by the photoelectric conversion element in accordance with a vertical scanning signal, and the second number of vertical light-receiving sections each having a signal output terminal electrically connected to the second terminals of the switch elements of the respective light-receiving elements are arrayed along a second direction, (2) the second number of integration circuits each for individually receiving an output from a corresponding one of the vertical light-receiving sections and performing an integration or non-integration operation of the current signal output from the vertical light-receiving section in a first capacitive element connected between an input and output terminals in accordance with a reset instruction signal, (3) the second number of sample-and-hold circuits each for receiving the signal output from a corresponding one of the integration circuits and performing a charge sample operation or charge hold operation for a second capacitive element in accordance with a sample instruction signal, (4) the second number of drive circuits each for receiving the signal output from a corresponding one of the sample-and-hold circuits and controlling an output drive ability in accordance with a horizontal scanning signal, (5) the second number of horizontal read circuits each for receiving the signal output from a corresponding one of the drive circuits and selectively outputting the signal in accordance with the horizontal scanning signal, and (6) a timing control section for issuing the vertical scanning signal, reset instruction signal, sample instruction signal, and horizontal scanning signal, wherein (7) the drive circuit comprises a differential amplifier, a current controller formed from a MOSFET to control a current from a constant voltage terminal, and a drive ability control circuit, the differential amplifier is arranged while having a positive input terminal connected to an output from the sample-and-hold circuit and a negative input terminal connected to an input to the horizontal read circuit, the current controller is arranged between the constant voltage terminal and the negative input terminal of the differential amplifier while having a gate terminal connected to an output terminal of the differential amplifier, the drive ability control circuit is connected to the negative input terminal of the differential amplifier, and when the horizontal scanning signal is insignificant to disable output, the output drive ability of the drive circuit is set in a low state through the drive ability control circuit, and when the horizontal scanning signal is significant to enable output, the output drive ability is set in a high state through the drive ability control circuit.

In such a solid-state image sensing device, first a current signal is output from the first light-receiving element of each vertical light-receiving section for which output is instructed by the vertical scanning signal. More specifically, after the reset instruction signal is temporarily set in the significant state, a vertical scanning signal for turning on only the switch element of the first light-receiving element in vertical scanning of each vertical light-receiving section is output. When the switch element is turned on, charges stored in the photoelectric conversion element by light reception so far are output from the light-receiving section as a current signal. The charges are instantaneously stored in the feedback capacitance by the integration circuit and output as a voltage. The signal output from the integration circuit is input to the sample-and-hold circuit.

The sample-and-hold circuit stores a charge amount corresponding to the charge amount stored in the photoelectric conversion element in accordance with the sample instruction signal, and outputs the charges to the drive circuit. Almost at the end of sampling operation, the vertical scanning signal is set not to select any light-receiving element.

Next, the horizontal scanning signal is set to sequentially alternatively select the horizontal read circuit and instruct the drive circuit corresponding to the vertical light-receiving section as a read target to switch to the high output drive ability state, and a detection signal corresponding to the first light-receiving element of each vertical light-receiving section is sequentially read.

In this way, the start of signal read and switching of the output drive ability are synchronized by the horizontal scanning signal. Hence, when no read is performed, the output drive ability is set to be low such that the solid-state image sensing device operates at low power consumption. When a read is to be performed, the output drive ability is set to be high to increase power consumption, thereby realizing a high-speed signal read. Hence, a solid-state image sensing device capable of a high-speed read operation and having low power consumption can be obtained.

Especially, when the current controller formed from a MOSFET for switching the drive ability and a drive ability control circuit are set independently of the differential amplifier and used to switch the output drive ability, a solid-state image sensing device which sufficiently ensures a dynamic range while maintaining the linearity of the output signal and can perform a high-speed operation can be obtained.

The reset instruction signal is set in the significant state until the signal read corresponding to the first light-receiving element of each vertical light-receiving section is ended after the completion of the sampling operation.

When the signal read for the first light-receiving element of each vertical light-receiving section is ended, the horizontal scanning signal is set not to output a signal corresponding to any vertical light-receiving section, the reset instruction signal is set in the insignificant state, and then, operation for the second light-receiving element of each vertical light-receiving section is started. By the same operation as described above, signals from the light-receiving elements of each vertical light-receiving section are sequentially read, thereby collecting signal data from all the light-receiving elements.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

A solid-state image sensing device according to a preferred embodiment of the present invention will be described below in detail with reference to the accompanying drawings. The same reference numerals denote the same elements throughout the drawings, and a detailed description thereof will be omitted. In the drawings and description below, the source terminal of an n-channel MOSFET is indicated by an arrow, thereby discriminating the source terminal from the drain terminal.

Figure 1:
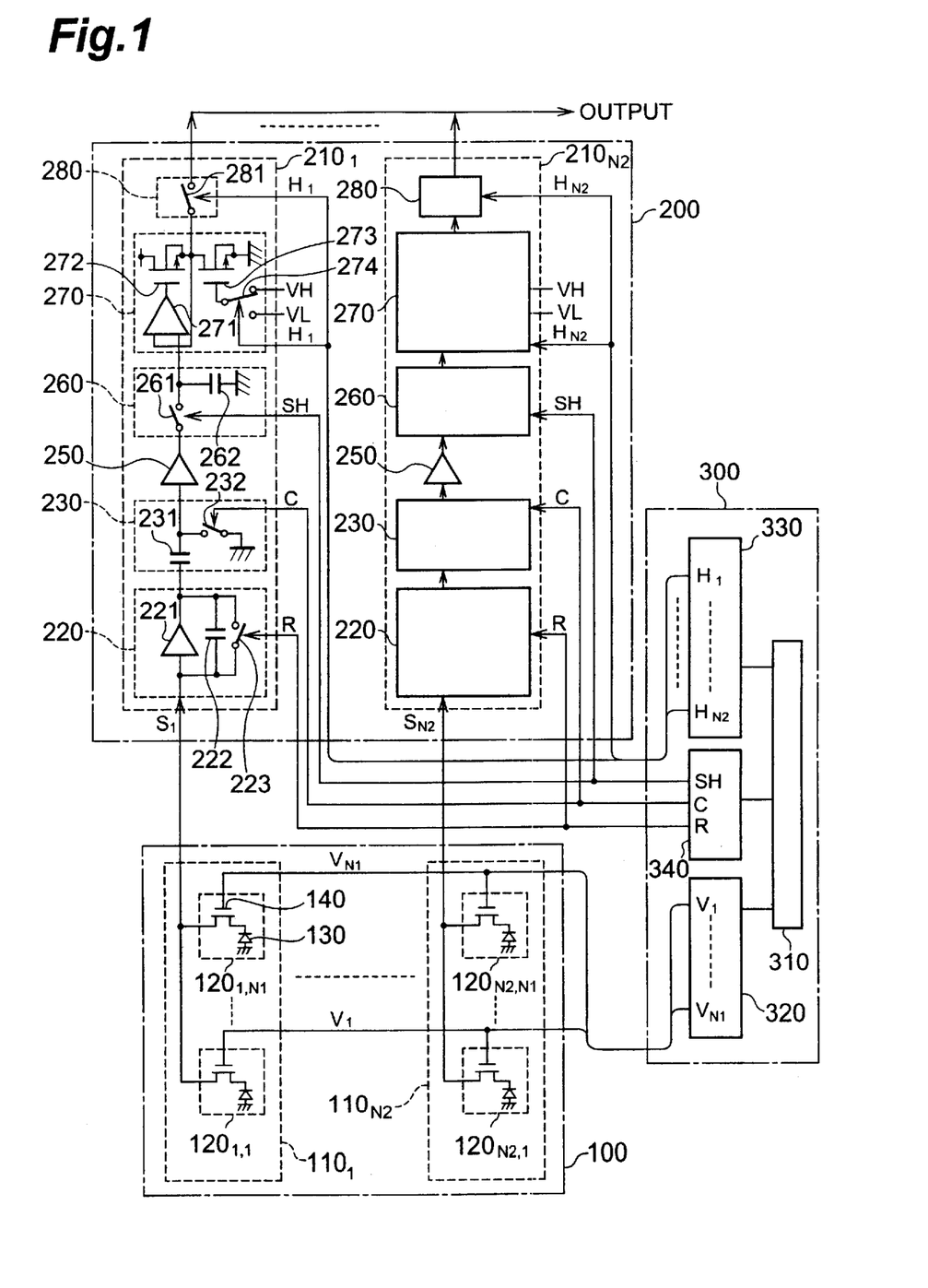
FIG. 1 is a circuit diagram showing a solid-state image sensing device according to an embodiment.

FIG. 1 is a circuit diagram showing a solid-state image sensing device according to an embodiment of the present invention. This circuit comprises (a) a light-receiving section 100 formed from N2 vertical light-receiving sections 110$_j$ (j=1 to N2) arrayed in a second direction (to be referred to as a horizontal direction hereinafter), each of which is formed from N1 light-receiving elements 120$_{j,i}$ (i=1 to N1) arrayed in a first direction (to be referred to as a vertical direction hereinafter), (b) a signal processing section 200 formed from horizontal signal processing sections 210$_j$ (j=1 to N2) for individually receiving and processing signals $s_j$ from the N2 vertical light-receiving sections 110$_j$ (j=1 to N2), and (c) a timing control section 300 for supplying an operation timing instruction signal to each element of the light-receiving section 100 and signal processing section 200.

Each of the N1×N2 light-receiving elements 120$_{j,i}$ (j=1 to N2, and i=1 to N1) two-dimensionally arrayed in the light-receiving section 100 has a photoelectric conversion element 130 for converting an input optical signal into a current signal, and a switch element 140 connected to the signal output terminal of the photoelectric conversion element 130 to output the current signal generated by the photoelectric conversion element 130 in accordance with a vertical scanning signal $V_i$ (i=1 to N1). For the N1 light-receiving elements 120$_{j,1}$ to 120$_{j,N1}$ vertically arrayed in each vertical light-receiving section 110$_j$, the signal output terminals of the switch elements 140 are electrically connected to each other whereby signals $s_{j,1}$ to $s_{j,1}$ from the light-receiving elements 120$_{j,1}$ to 120$_{j,N1}$ are merged and input to the signal processing section 200 as one signal $s_j$.

Which one of the light-receiving elements 120$_{j,1}$ to 120$_{j,N1}$ outputs a signal as the signal $s_j$ is set by "ON" or "OFF" of the switch elements 140 by the instruction from vertical scanning signals $V_1$ to $V_{N1}$ from a vertical scanning section 320 of the timing control section 300. Thus, the correspondence between the signal $s_j$ input to the horizontal signal processing sections 210$_j$ of the signal processing section 200 and the signals $s_{j,1}$ to $s_{j,N1}$ from the light-receiving elements 120$_{j,1}$ to 120$_{j,N1}$ is controlled.

The signal processing section 200 has the N2 horizontal signal processing sections 210$_j$ (j=1 to N2). Each horizontal signal processing section 210$_j$ receives the signal $s_j$ from a corresponding vertical light-receiving section 110$_j$. The horizontal signal processing sections 210$_j$ have the same arrangement. Referring to FIG. 1, a horizontal signal processing section 210$_1$ corresponding to a vertical light-receiving section 110$_1$ is shown with a detailed circuit arrangement, a horizontal signal processing section 210$_{N2}$ corresponding to a vertical light-receiving section 110$_{N2}$ is shown with a simple circuit arrangement, and remaining horizontal signal processing sections 210$_2$ to 210$_{N2-1}$ are not illustrated, like vertical light-receiving sections 110$_2$ to 110$_{N2-1}$.

Each horizontal signal processing section 210$_j$ comprises (i) an integration circuit 220 for receiving the signal $s_j$ from vertical light-receiving section 110$_j$ and performing an integration operation (when a reset instruction signal R=insignificant) or non-integration operation (when the reset instruction signal R=significant) of the signal $s_j$ for a capacitive element 222 connected between the input and output terminals in accordance with the reset instruction signal R, (ii) a clamp circuit 230 having a capacitive element 231 for receiving the signal output from the integration circuit 220, reducing the signal by the offset amount of the integration circuit 220, and outputting the signal, and a switch element 232 for receiving the signal through the capacitive element 231 and short-circuiting the signal through the capacitive element 231 to ground level in accordance with a clamp instruction signal C, (iii) a buffer circuit 250 for receiving the signal output from the clamp circuit 230, impedance-converting the input signal, and outputting it, (iv) a sample-and-hold circuit 260 having a switch element 261 which receives the signal output from the buffer circuit 250 and is connected in accordance with a sample instruction signal SH, and a capacitive element 262 for performing the sample-and-hold operation when the switch element 261 is connected, (v) a drive circuit 270 for receiving the signal from the sample-and-hold circuit 260, switching the output drive ability in accordance with a horizontal scanning signal $H_j$, and outputting data at a high speed in a signal read, and (vi) a horizontal read circuit 280 for receiving the signal output from the drive circuit 270 and outputting the signal in accordance with the horizontal scanning signal $H_j$.

The integration circuit 220 comprises a charge amplifier 221 for receiving the signal $s_j$ from each vertical light-receiving section 110$_j$, a capacitive element 222 having one terminal connected to the input terminal of the charge amplifier 221 and the other terminal connected to the output terminal of the charge amplifier 221, and a switch element 223 having one terminal connected to the input terminal of the charge amplifier 221 and the other terminal connected to the output terminal of the charge amplifier 221, turned on when the reset instruction signal R is significant, and turned off when the reset instruction signal R is insignificant.

In the above embodiment, the clamp circuit 230 and buffer circuit 250 are inserted between the integration circuit 220 and the sample-and-hold circuit 260. In this case, the DC component of the output signal from the integration circuit 220 is cut by the capacitive element 231 of the clamp circuit 230, so charge storage during the invalid period of the signal in the sampling operation by the sample-and-hold circuit 260 is prevented. In addition, the signal with a low output impedance is input to the sample-and-hold circuit 260 through the buffer circuit 250. Consequently, noise can be reduced.

Figure 2:
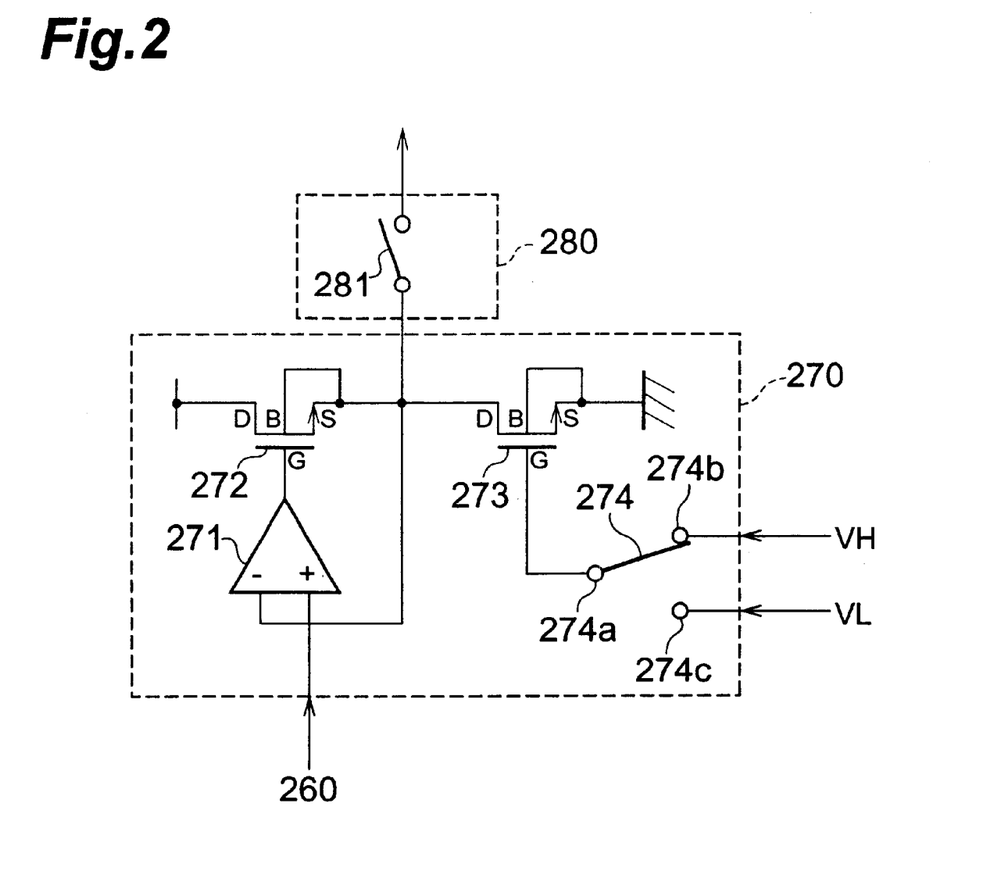
FIG. 2 is a circuit diagram of a drive circuit and horizontal read circuit.

FIG. 2 is an enlarged circuit diagram of the drive circuit 270 and horizontal read circuit 280 shown in FIG. 1. Referring to FIG. 2, input of the horizontal scanning signal $H_j$ is not illustrated. Referring to FIG. 2, as for the terminals of an n-channel MOSFET, reference symbol G denotes a gate terminal; D, a drain terminal; S, a source terminal; and B, a base terminal.

The drive circuit 270 comprises a differential amplifier 271 for receiving the signal from the sample-and-hold circuit 260 and outputting the signal data to the horizontal read circuit 280, a current controller 272 formed from an n-channel MOSFET, a current source 273 formed from an n-channel MOSFET for supplying a current to the current controller 272, and a drive change-over switch 274 for switching the drive voltage to the current source 273. The current source 273 and drive change-over switch 274 construct a drive ability control circuit for controlling the output drive ability.

In this embodiment, the signal from the sample-and-hold circuit 260 is input to the positive input terminal of the differential amplifier 271. The negative input terminal is connected to the output to the horizontal read circuit 280 and the source terminal of the current controller 272. The output terminal of the differential amplifier 271 is connected to the gate terminal of the current controller 272. The source terminal of the current controller 272 is connected to the drain terminal of the current source 273. With this arrangement, the speed of signal read by the differential amplifier 271 and current controller 272 can be switched in accordance with the amount of current whose supply is controlled by the current source 273. The drain terminal of the current controller 272 is connected to a predetermined constant voltage terminal, and the source terminal of the current source 273 is connected to the ground terminal.

The gate terminal of the current source 273 is connected to one terminal 274a of the drive change-over switch 274. The drive change-over switch 274 has two terminals 274b and 274c on the other side. Connection to the terminals 274b and 274c is switched by the drive change-over switch 274. A power supply (not shown) for applying a first voltage VH as a high voltage is connected to the terminal 274b. A power supply (not shown) for applying a second voltage VL as a low voltage is connected to the terminal 274c. The first voltage VH and second voltage VL are set to different voltages satisfying VH>VL. When this connection is switched by the drive change-over switch 274, the amount of current supplied from the current source 273 to the current controller 272 is switched to control the output drive ability. A detailed control method will be described later.

In this embodiment, the base terminal of the current controller 272 is connected to the source terminal (the negative input terminal of the differential amplifier 271). The base terminal of the current source 273 is also connected to the source terminal. When the base terminal of a MOS-FET is connected in this way, the dynamic range of the output can be further widened while suppressing the substrate effect.

When the drive circuit 270 having the above arrangement is used, a solid-state image sensing device capable of widening the dynamic range of the output signal and increasing power consumption to enable a high-speed operation only if it is necessary can be obtained.

The horizontal read circuit 280 has a switch element 281 which receives the signal output from the drive circuit 270 by one terminal and is turned on/off in accordance with the instruction of the horizontal scanning signal $H_j$.

The timing control section 300 comprises (i) a fundamental timing section 310 for generating a fundamental timing signal, (ii) a vertical scanning section 320 for generating the vertical scanning signal $V_i$ in accordance with a vertical output timing instruction from the fundamental timing section 310, (iii) a horizontal scanning section 330 for generating the horizontal scanning signal $H_j$ in accordance with the horizontal output timing instruction from the fundamental timing section 310 and (iv) a control signal section 340 for generating the sample instruction signal SH, clamp instruction signal C, and reset instruction signal R in accordance with timing instructions from the fundamental timing section 310.

Figure 3:
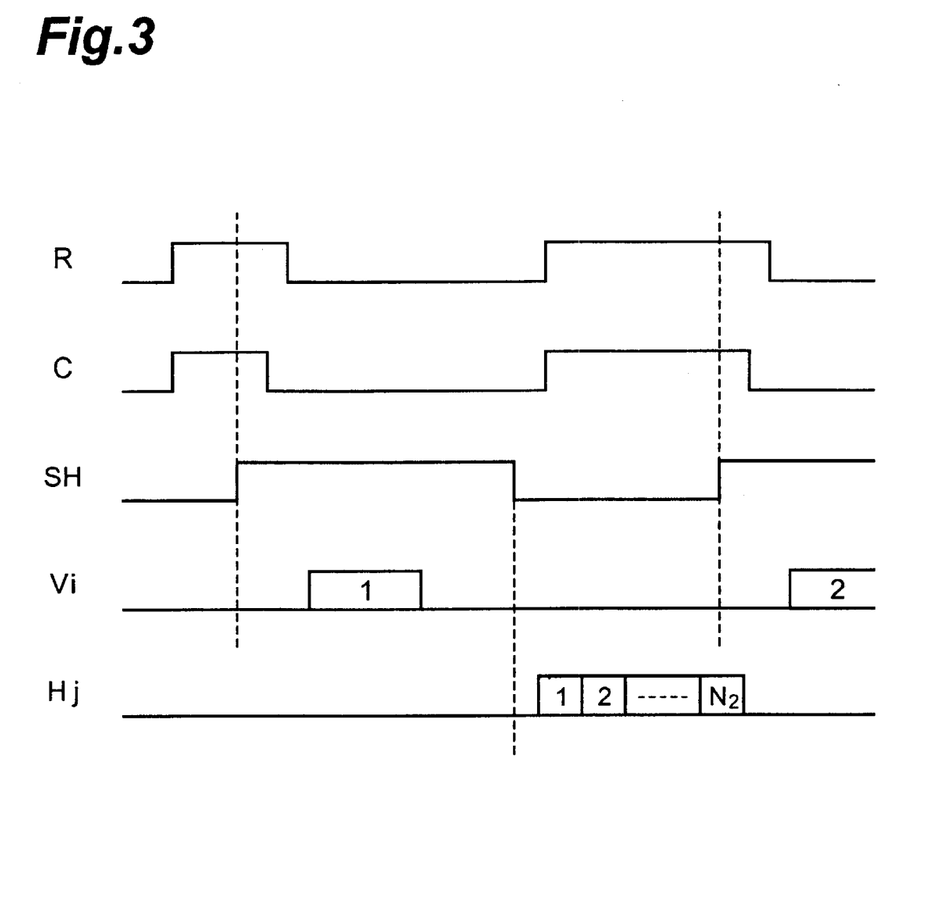
FIG. 3 is a timing chart showing control of the solid-state image sensing device according to the embodiment shown in FIG. 1.

The solid-state image sensing device of this embodiment collects signal data from the light-receiving section 100 in the following way. FIG. 3 is a timing chart showing an embodiment of timing control in this embodiment. As for the high and low levels in the timing chart, the high level corresponds to a significant signal, and the low level corresponds to an insignificant signal. Numbers assigned to the significant mode of the vertical scanning signal $V_i$ represent vertical numbers i (i=1 to N1) for an output instruction, and numbers assigned to the significant mode of the horizontal scanning signal $H_j$ represent horizontal numbers j (j=1 to N2) for an output instruction.

In this embodiment, while the horizontal scanning signal $H_j$ is set not to select output of a signal corresponding to any-vertical light-receiving section $110_j$ (i.e., the switch elements 281 of all the horizontal read circuits 280 are "OFF"), the timing control section 300 sets the reset instruction signal R and clamp instruction signal C in the significant state, and sets the sample instruction signal SH in the significant state during the significant period of the reset instruction signal R such that the signal input to the sample-and-hold circuit 260 is input to the capacitive element 262 through the switch element 261.

While keeping the sample instruction signal SH significant, the reset instruction signal R and clamp instruction signal C are set in the insignificant state. After that, the vertical scanning signal $V_1$ for turning on the switch element 140 of the first light-receiving element $120_{j,1}$ of each vertical light-receiving section $110_j$ is output. When the switch element 140 is turned on, charges stored in the photoelectric conversion element 130 by light reception so far are output from the light-receiving section 100 as a current signal.

The charges are instantaneously stored in the capacitive element 222 by the integration circuit 220 and output as a voltage. Subsequently, the offset is reduced through the capacitive element 231 of the clamp circuit 230, the impedance is converted by the buffer circuit 250, and the signal data is input to the sample-and-hold circuit 260.

In the sample-and-hold circuit 260, the signal output from the buffer circuit 250 is input to the capacitive element 262 through the switch element 261, and charges corresponding to the voltage value of the signal output from the buffer circuit 250 are stored in the capacitive element 262.

After the elapse of sampling time, the sample instruction signal SH is set in the insignificant state, and the switch element 261 is turned off, thereby ending sampling.

Next, the horizontal scanning signal $H_j$ is set to sequentially alternatively select the horizontal read circuits 280, and the drive voltage is switched by the drive change-over switch 274 of the drive circuit 270. More specifically, the horizontal scanning signal $H_1$ is set in the significant state, the switch element 281 of the horizontal read circuit 280 in the horizontal signal processing section $210_1$ is turned on to start output.

Simultaneously, in the drive circuit 270, the drive change-over switch 274 which is connected to the third terminal 274c for supplying the second voltage VL as a low voltage and selects the low output drive ability state when the horizontal scanning signal $H_1$ is insignificant is connected to the second terminal 274b for supplying the first voltage VH as a high voltage when the horizontal scanning signal $H_1$ is set in the significant state, so the drive circuit 270 is switched to the high output drive ability state. Thus, when no signal read is performed, operation with a small current is performed to reduce power consumption, and when a signal read is to be performed, operation with a large current is performed to enable a high-speed signal read operation. Hence, a solid-state image sensing device which can perform high-speed operation and reduce power consumption can be implemented.

Subsequently, all the horizontal scanning signals $H_j$ are sequentially set in the significant state, and the horizontal signal processing sections $210_j$ sequentially perform the signal read in the same way.

The reset instruction signal R and clamp instruction signal C are set in the significant state until the signal read corresponding to the first light-receiving element $120_{j,1}$ of each vertical light-receiving section $110_j$ is ended after the completion of the sampling operation.

When the sequential signal read corresponding to the light-receiving elements $120_{j,1}$ is ended, the horizontal scanning signal $H_j$ is set not to select any signal read, and the vertical scanning signal $V_1$ is set not to select any light-receiving element. As in the above-described case, the sample instruction signal SH is set in the significant state during the significant period of the reset instruction signal R such that the signal input to the sample-and-hold circuit 260 is input to the capacitive element 262 through the switch element 261.

While keeping the sample instruction signal SH significant, the reset instruction signal R and clamp instruction signal C are set in the insignificant state. After that, the vertical scanning signal $V_2$ is output for a predetermined time. Thus, the second light-receiving elements $120_{j,2}$ of each vertical light-receiving section $110_j$ outputs a signal.

After that, as in the case of the light-receiving elements $120_{j,1}$, signals corresponding to the light-receiving elements $120_{j,2}$ are sequentially read. The signal read is sequentially similarly performed to read signals from all light-receiving elements.

The solid-state image sensing device which switches itself to the high output drive ability state only when the signal read is to be executed, thereby simultaneously attaining a high-speed read and low power consumption can have an arrangement in which the bias voltage is switched by, e.g., the differential amplifier itself (Japanese Patent Laid-Open No. 10-23336). However, when the bias voltage is switched by the differential amplifier, the chip area increases, and the operating point of the amplifier changes. Hence, no stable operation can be ensured.

To the contrary, in the solid-state image sensing device of the above-described embodiment, the output drive ability is switched by an external drive ability control circuit separated from the differential amplifier 271, and this drive ability control circuit is operated in synchronism with the horizontal scanning signal, thereby switching the output drive ability. Since the differential amplifier 271 itself is simplified, the chip area can be reduced.

The present invention is not limited to the above-described embodiment, and various changes and modifications can be made. For example, although the light-receiving elements are two-dimensionally arrayed in the above embodiment, they may be one-dimensional arrayed. This corresponds to N1=1 in the solid-state image sensing device shown in FIG. 1.

The drive ability control circuit for controlling the output drive ability of the drive circuit is not limited to the arrangement using the current source and drive change-over switch each formed from an n-channel MOSFET, and a circuit having another form and the same function as described above may be used.

The present invention can be used to sense a one- or two-dimensional optical image as a solid-state image sensing device which enables high-speed operation while ensuring the dynamic range of the output signal and reduces power consumption even when the elements are integrated. Especially, the drive circuit having a differential amplifier, current controller formed from a MOSFET, and a drive ability control circuit sets the output drive ability in the high state only in the signal read, and otherwise sets the ability in the low output drive ability state, thereby reducing power consumption. Hence, a solid-state image sensing device having low power consumption and capable of a high-speed read while ensuring a wide dynamic range can be obtained.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid-state image sensing device for sensing an input optical image, comprising:

a light-receiving section in which a first number of light-receiving elements are arrayed along a first direction forming a vertical light-receiving section, each light-receiving element including a photoelectric conversion element for converting an input optical signal into a current signal and a switch element having a first terminal connected to a signal output terminal of said photoelectric conversion element and a second terminal for outputting the current signal generated by said photoelectric conversion element in accordance with a vertical scanning signal, and a second number of vertical light-receiving sections arrayed along a second direction, each vertical light-receiving section having a signal output terminal electrically connected to the second terminal of each switch element in the respective vertical light-receiving section;

a second number of integration circuits each for individually receiving an output from a corresponding one of said vertical light-receiving sections and performing an integration or non-integration operation of the current signal output from said vertical light-receiving section in a first capacitive element connected between an input and output terminals in accordance with a reset instruction signal;

a second number of sample-and-hold circuits each for receiving the signal output from a corresponding one of said integration circuits and performing a charge sample operation or charge hold operation for a second capacitive element in accordance with a sample instruction signal;

a second number of drive circuits each for receiving the signal output from a corresponding one of said sample-and-hold circuits and controlling an output drive ability in accordance with a horizontal scanning signal;

a second number of horizontal read circuits each for receiving the signal output from a corresponding one of said drive circuits and selectively outputting the received signal in accordance with the horizontal scanning signal; and a timing control section for issuing the vertical scanning signal, reset instruction signal, sample instruction signal, and horizontal scanning signal, wherein said drive circuit comprises a differential amplifier, a current controller formed from a MOSFET to control a current from a constant voltage terminal, and a drive ability control circuit, said differential amplifier is arranged while having a positive input terminal connected to an output from said sample-and-hold circuit and a negative input terminal connected to an input to said horizontal read circuit, said current controller is arranged between the constant voltage terminal and the negative input terminal of said differential amplifier while having a gate terminal connected to an output terminal of said differential amplifier, said drive ability control circuit is connected to the negative input terminal of said differential amplifier, and when the horizontal scanning signal is insignificant to disable output, the output drive ability of said drive circuit is set in a low state through said drive ability control circuit, and when the horizontal scanning signal is significant to enable output, the output drive ability is set in a high state through said drive ability control circuit.

2. A device according to claim 1, wherein said drive ability control circuit of said drive circuit comprises a current source formed from a MOSFET, and a drive change-over switch element having a first terminal, second terminal, and third terminal, said current source is arranged between the negative input terminal of said differential amplifier and a ground terminal while having a gate terminal connected to the first terminal of said drive change-over switch element, said drive change-over switch element has the second terminal connected to a power supply for supplying a first voltage VH and the third terminal connected to a power supply for supplying a second voltage VL, the first voltage VH and second voltage VL satisfy VH>VL, and when the horizontal scanning signal is insignificant to disable output, the output drive ability of said drive circuit is set in the low state by connecting the first terminal and third terminal of said drive change-over switch element, and when the horizontal scanning signal is significant to enable output, the output drive ability is set in the high state by connecting the first terminal and second terminal of said drive change-over switch element.

3. A device according to claim 1, wherein said current controller has a base terminal connected to the negative input terminal of said differential amplifier.

4. A device according to claim 1, further comprising:

a second number of clamp circuits between said integration circuit and said sample-and-hold circuit, each clamp circuit having a third capacitive element for receiving the signal output from a corresponding one of said integration circuits, reducing an offset amount for each integration circuit, and outputting the signal, and a clamp element for receiving the signal through said third capacitive element and short-circuiting a signal output terminal of said third capacitive element to a reference potential in accordance with a clamp instruction signal, and a second number of buffer circuits each for receiving the signal output from a corresponding one of said clamp circuits, impedance-converting the signal output from a corresponding one of said clamp circuits, and outputting the impedance-converted signal to said sample-and-hold circuit, and wherein said timing control section further outputs the clamp instruction signal.

* * * * *